United States Patent [11] 3,529,506

[72] Inventors Eugen Olof Malm
  Rune Lennart Gustafsson, Sandviken, Sweden
[21] Appl. No. 650,673
[22] Filed July 3, 1967
[45] Patented Sept. 22, 1970
[73] Assignee Sandvikens Jernverks Aktiebolag
  Sandviken, Sweden
  a corporation of Sweden
[32] Priority July 27, 1966
[33]  Sweden
[31]  No. 10210/66

[54] FASTENER FOR CUTTING DIES
  5 Claims, 6 Drawing Figs.
[52] U.S. Cl. .................................................. 83/698, 85/70
[51] Int. Cl. .................................................... B26f 1/46
[50] Field of Search ...................................... 83/698, 696; 76/107, 107C; 85/74, 75, 73, 70; 83/657, 699, 700

[56] References Cited
  UNITED STATES PATENTS
2,052,793 9/1936 Peirce ........................ 85/74
2,504,642 4/1950 Burgess ...................... 76/107X
  FOREIGN PATENTS
490,686 2/1954 Italy ........................... 83/657

*Primary Examiner*—Andrew R. Juhasz
*Assistant Examiner*—Z. R. Bilinsky
*Attorney*—Pierce, Scheffler and Parker ABSTRACT: The bottom plate of a "click" cutter is pierced by a plurality of groups of oblong parallelly oriented slots. Each of a plurality of cutting dies comprises a cutting element in the form of a knife-edged "ribbon" describing a closed figure (having the profile of a desired work piece) which die is strengthened and rendered rigid by means of horizontal cross straps or bridging elements extending from one side to the other of the die and disposed in a plane parallel to but remote from the plane of the knife edge, which cross straps preferably are not parallel to each other. Said cross straps are pierced by a plurality of oblong slots whose axes are parallel to the major axes of the cross straps. The cutting dies are secured to the plate of the cutter by expansion bolts inserted in crossings of plate slots and cross strap slots. The expansion bolt used for this purpose comprises a casing or sleeve one end of which is slotted, a screw member within the casing said screw member being conical in that portion thereof adjacent the slotted part of the casing and having screw threads about that end thereof which is remote from said conical part, said threaded end extending outside of said casing, and a nut whose interior threads are complementary to the screw threads on said screw member. An elastic or resilient washer or socket member may be disposed between casing and cross strap slot to provide limited lateral movement of cutting die on the bottom plate of the cutter.

Patented Sept. 22, 1970 3,529,506

FASTENER FOR CUTTING DIES

This invention relates to cutters and is concerned with improvements in securing cutting dies to the upper or lower plate of a "click" cutter.

In certain industries, e.g., clothing or leather goods manufacture, work pieces are cut from larger pieces or sheets of raw material with the aid of cutting dies, which are bent according to the shape of the desired work pieces. Often, a number of such cutting dies are fastened on a cutter plate and simultaneously pressed through one or usually several layers of the actual piece material laid one upon another. In order to make room for as many cutting dies as possible side by side on the cutter plate it is desirable to use fastening equipment which permits lateral adjustment of the lateral position of the cutting dies. Moreover, it is necessary to give the attachment a certain lateral flexibility, as otherwise the dies will be broken by the lateral pressure from the material undergoing cutting.

Earlier, people have tried to weld the cutting dies onto the cutter plate, but this proved to be inappropriate as the dies broke down by the lateral pressure of the cut material. To screw the dies on with bolts in butt fit up to the plate without provision for lateral movement gave the same undesirable result. There have been attempts made to fasten the dies with bolts and to insert elastic inserts between the dies and the plate, which disposition improves the strength but is complicated and makes lateral adjustment of the dies impossible.

The present invention constitutes an improvement in the above aspects, and provides an attachment by means of expansion bolts which are fastened in slots in the upper or lower plate of the cutter and in the cross straps of the dies. In this way an arbitrary lateral placing of the dies is made possible, at the same time as the attachment is made flexible laterally, so that the dies will not be broken by reason of the cutting forces.

The invention will now be described in greater particularity and with reference to the accompanying drawing, in which.

Figure 1:
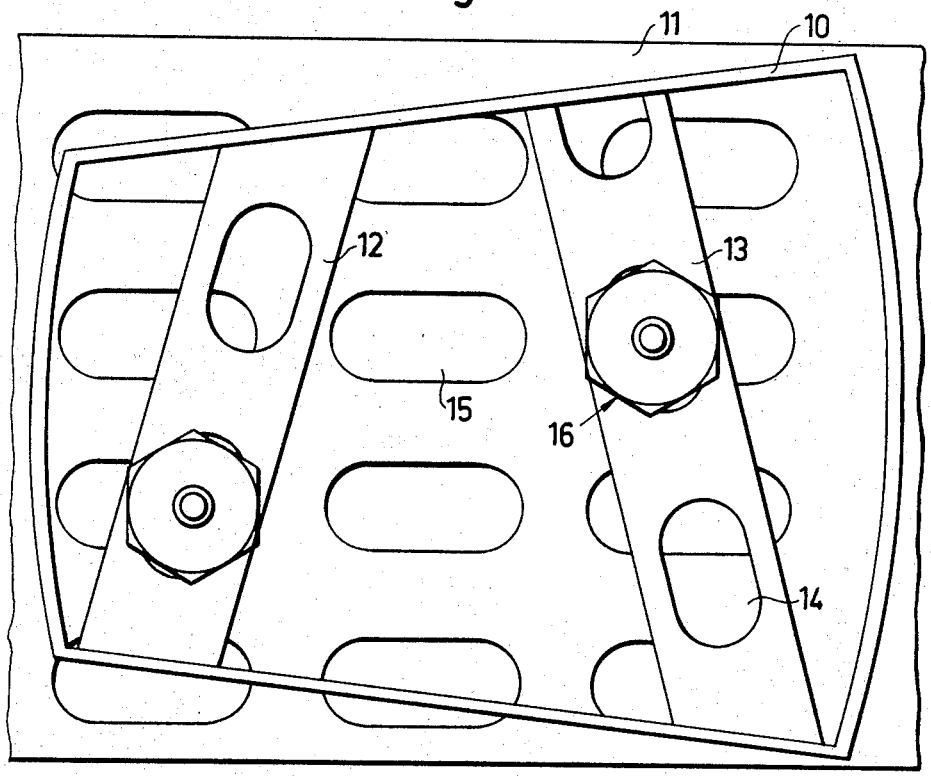
FIG. 1 is a plane view of a cutting die fastened on a cutter plate according to the invention.

The cutting die 10 which is shown in FIG. 1 is attached to a bottom plate 11 of a click cutter. The die forms a closed figure and is strengthened with horizontal cross straps 12 and 13 which have oblong through slots 14 arranged in the longitudinal direction of the straps. The plate 11 is provided with a large number of similar oblong slots 15, arranged in parallel rows. The slots 14 and 15 are arranged in different directions, and at those points where the slots cross each other expansion bolts 16 are or can be attached to fasten the dies onto the plate. In the example shown, the die 10 has its knife edge 10a directed upwards, but it is also possible to turn the die downwards, whereby the plate 11 will lie above the die and will constitute the upper, rather than the lower, plate of the cutter.

The expansion bolts 16 consist each of a casing 17 which at its lower portion 18 is slotted and internally conical and at its upper portion 19 is unbroken (i.e., continuous) ring-shaped. Inside the casing is situated a screw 20 which has a conical portion 21 corresponding to the internally conical portion 18 of the sleeve and a threaded portion 22, on which a nut 23 is threaded. The upper portion 19 of the casing is surrounded by a socket 24 consisting of an elastic material, which at its lower portion abuts a stop bolt or abutment 25 on the casing, and which arises somewhat above the upper portion 19 of the casing. In fastening the nut 23, the socket 24 is pressed together and hereby forced to expand laterally. The socket has to be made of a suitable elastic material such as plastic or natural or synthetic rubber, i.e., trekollan.

Figure 3:
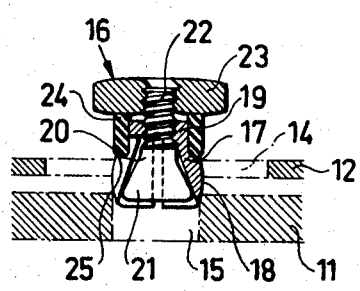
FIG. 3 shows an expansion bolt for fastening a die according to the invention.

FIG. 3 shows the expansion bolt when being brought down through a slot 14 in the cross strap 12 of a die and into a slot 15 in the plate 11. When the bolt is brought down to its full depth (FIG. 4) the nut 23 is fastened. If the portions 18 and 19 are exteriorly cylindrical the bolt can —in fastening— be prevented from rotating by providing that the socket 24 have a close fit in the slot 14 and the portion 18 have close fit in the slot 15. The screw 20 is prevented from rotating by the engagement of the cone 21 with the casing portion 18.

Figure 5:
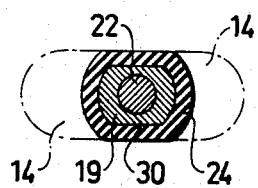
FIGS. 5 and 6 show modified sections of the expansion bolt illustrated in FIG. 4.
Figure 6:
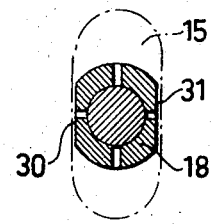

In order to achieve further security against rotation of casing 17, it is possible to make the casing with oblong square-section either at its upper or lower portion. FIG. 5 shows a design of the section 5—5 in FIG. 4 whereby the upper portion 19 of the casing has bevels 30 so that the socket 24 is oblong in the zone of the slot 14 and thereby prevents rotation of the casing 17. In the design of FIG. 6 the lower portion 18 of the casing is, instead, shaped oblong so that the slot 15 prevents rotation of the casing.

Figure 4:
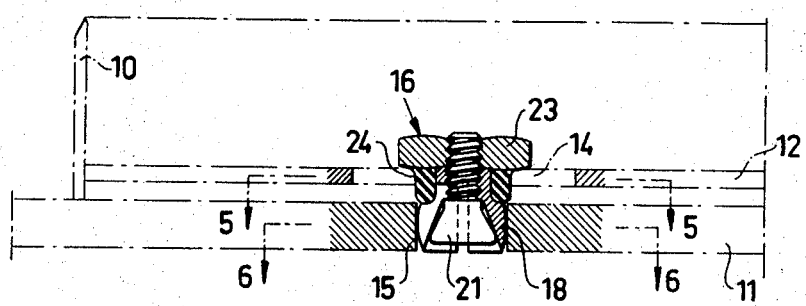
FIG. 4 shows the expansion bolt of FIG. 3 in screwed-down position.

FIG. 4 shows the expansion bolt in fastened position, whereby the slotted lower portion 18 of the casing 17 is expanded by the cone 21 so that the bolt is secured on the edges of the slot 15 in the plate 11. The socket 24 has been pressed together by screwing down the nut 23, and has expanded laterally and by the pressure of the socket towards the edges of the slot 14 and the under side of the nut 23, the die is elastically fastened by the bolt and has a limited ability to move laterally. Eventually, the socket 24 can be completed with or replaced by an elastic washer (not shown), i.e. a spring washer between the nut 23 and the strap 13. Another alternative is to do away with elastic fastening and to allow a little free space between the bolt and the die.

The slots 14 and 15 should be situated with as tight pitch intervals that the die can be attached in an arbitrary position on the plate 11. The orientation of the longitudinal directions of the slots shall be such that those directions form an angle to each other large enough —that is, as close as possible to 90°— to obtain enough possibility of adjustment in two directions perpendicular to each other.

Figure 2:
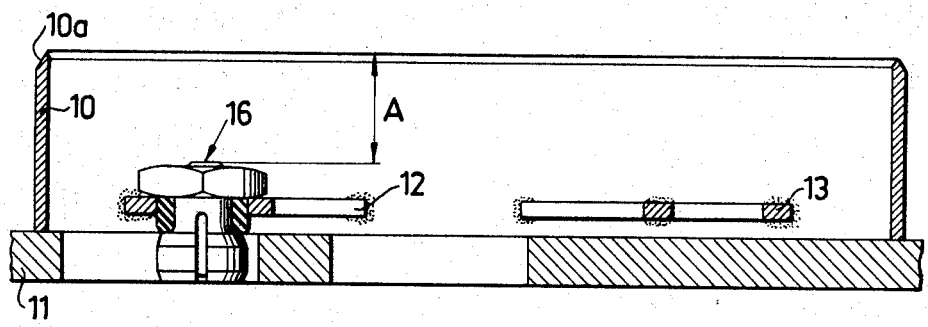
FIG. 2 is a vertical view of the die shown in FIG. 1.

As is seen from FIG. 2 the cross straps shall lie low and the bolts 16 have little height, so that the free space A will be as large as possible as this space limits the thickness of the layers of material to be cut in one operation of the cutter.

With the described equipment the substantial advantage is achieved that the dies can be fastened to, and adjusted at arbitrary positions over a cutter plate, so that on a plate of a certain dimension, e.g. 1 m. x 2 m., as large a number as possible of dies can be fitted. Moreover the equipment makes it possible at new dispositions of the dies to move them to new positions. The elastic attachment of the die has an essential importance in allowing a small lateral elasticity, whereby the dies are prevented from being broken by the lateral forces from material being pressed down between the dies.

The invention is suitable in cutting textiles and leather, and also in cutting other cuttable materials, i.e., plastic or asbestos plates. Also, the invention can be used in cutting thin sheet metals i.e. brass.

We claim:

1. Equipment for fastening cutting dies on a plate of a cutter comprising a plate provided with a plurality of rows of a series of separated oblong slots, each series of separated slots of one row lying in one general longitudinal direction, and the rows of said slots being juxtaposed so that each oblong slot is separated from adjacent slots by intermediate portions of the plate, at least one cutting die provided with cross straps disposed between the sides of said at least one die and provided with horizontal oblong slots therethrough disposed in a direction different from the slots of the plate, and at least one expansion bolt disposed in a slot of the plate and a slot of a cross strap where said slots intersect for attaching the cutting die to the plate whereby the rear edge of the cutting die rests on intermediate portions of the plate between the separated oblong slots, said expansion bolt including means for expansion only within the slot of the plate while permitting lateral play of the bolt within the slot of the cross strap.

2. Equipment as defined in claim 1 and including an elastic sleeve member surrounding the upper portion of the expansion bolt to engage the edges of the slot of the cross strap whereby the cutting die is resiliently attached to the plate.

3. Equipment as defined in claim 2 wherein the lower portion of the expansion bolt is provided with a casing having an abutment for receiving the lower edge of the elastic sleeve member whereby the sleeve member expands radially to engage the slot of the cross strap when it is compressed axially by tightening the bolt.

4. Equipment as defined in claim 1 wherein the lower portion of said at least one expansion bolt is provided with a casing having an oblong horizontal cross section the smallest dimension of which corresponds with the smallest dimension of the slot in said cutter plate through which said expansion bolt extends whereby said casing is prevented from rotating when the expansion bolt is tightened.

5. Equipment as defined in claim 2 wherein the upper portion of said at least one expansion bolt and the elastic sleeve member surrounding said upper portion have an oblong horizontal cross section, the smallest dimension of which corresponds substantially with the smallest dimension of the slot in the cross strap through which said expansion bolt extends whereby the elastic sleeve member is prevented from rotating when the expansion bolt is tightened.